United States Patent
Iwatani

(10) Patent No.: US 8,860,974 B2
(45) Date of Patent: Oct. 14, 2014

(54) PRINT CONTROL APPARATUS AND PRINT CONTROL PROGRAM

(75) Inventor: Masaharu Iwatani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 804 days.

(21) Appl. No.: 13/038,318

(22) Filed: Mar. 1, 2011

(65) Prior Publication Data

US 2011/0217049 A1    Sep. 8, 2011

(30) Foreign Application Priority Data

Mar. 3, 2010    (JP) ................................. 2010-046301

(51) Int. Cl.
    G06K 15/00    (2006.01)
    G03G 15/00    (2006.01)
(52) U.S. Cl.
    CPC ...................................... *G03G 15/00* (2013.01)
    USPC ........................................................ 358/1.14
(58) Field of Classification Search
    None
    See application file for complete search history.

(56) References Cited

U.S. PATENT DOCUMENTS

2007/0123256 A1*   5/2007   Whitesell et al. .......... 455/435.1
2007/0285704 A1*  12/2007   Wu .............................. 358/1.15

FOREIGN PATENT DOCUMENTS

JP        2001-312380 A     11/2001

\* cited by examiner

*Primary Examiner* — Mark Zimmerman
*Assistant Examiner* — Lawrence Wills
(74) *Attorney, Agent, or Firm* — Kilpatrick Townsend & Stockton LLP

(57) ABSTRACT

A print control apparatus includes a communication unit which communicates with a server, a print instruction acceptance unit which accepts a print instruction to make a printing apparatus execute printing, a judgment unit which judges whether or not the printing apparatus is a registered printing apparatus, a permission unit which permits the printing apparatus to execute printing based on the print instruction when the printing apparatus has been judged to be the registered printing apparatus, a restriction unit which inhibits the printing apparatus from executing printing based on the print instruction when the printing apparatus has not been judged to be the registered printing apparatus, and a notification unit which makes a notification for prompting a user to register the printing apparatus on the server as the registered printing apparatus when the printing apparatus has not been judged to be the registered printing apparatus.

8 Claims, 4 Drawing Sheets

PRINT CONTROL APPARATUS AND PRINT CONTROL PROGRAM

This application claims priority to Japanese Patent Application No. 2010-046301, filed Mar. 3, 2010, the entirety of which is incorporated by reference herein.

BACKGROUND

1. Technical Field

The present invention relates to a technique of executing printing on a registered printing apparatus.

2. Related Art

In JP-A-2001-312380, a following technique is disclosed. That is, it is judged whether or not a user ID included in a print job is registered on a server. If the user ID is not registered on the server, the print job is not permitted to be executed. When the print job is not permitted to be executed, that the printing is not permitted is notified to a client PC and the print job is deleted (see, paragraph 0022).

In JP-A-2001-312380, there has been a following problem. That is, when that the printing is not permitted is notified, a user does not know how the printing is permitted. In the case of JP-A-2001-312380, printing is permitted by registering the user ID on the server. However, there has been a problem that a user cannot recognize the need to register the user ID on the server.

SUMMARY

An advantage of some aspects of the invention is to provide a technique of guiding a user so as to enable printing to be permitted when the printing has been inhibited from being executed.

1. In a print control apparatus according to an aspect of the invention, when a print instruction is accepted, it is judged whether or not a printing apparatus is a registered printing apparatus which has been registered based on registration information acquired from a server. When the printing apparatus has been judged to be the registered printing apparatus, the printing apparatus is permitted to execute printing based on the print instruction. On the other hand, when the printing apparatus has not been judged to be the registered printing apparatus, the printing apparatus is inhibited from executing printing based on the print instruction. Therefore, it can be made essential that the printing apparatus be registered in order to make the printing apparatus execute printing. Further, when printing on the printing apparatus which has not been registered is inhibited from being executed, a notification for prompting a user to register the printing apparatus on the server as a registered printing apparatus is made. With this, even when printing is inhibited from being executed, a user can be guided so as to enable the printing to be permitted.

2. When a notification unit makes the above notification, an instruction to execute a registration request processing of requesting the server to register the printing apparatus as the registered printing apparatus is accepted. With this, a user can be smoothly guided so as to register the printing apparatus.

3. Further, in the registration request processing, a registration request for requesting the server to register the printing apparatus as the registered printing apparatus is transmitted to the server, and then, registration information is newly acquired from the server. With this, registration information in which the registration of the printing apparatus as the registered printing apparatus has been reflected can be acquired. Accordingly, when a print instruction is accepted after the registration information has been newly acquired from the server in the registration request processing, the printing apparatus can be permitted to execute printing. Further, registration information is not required to be acquired from the server every time a print instruction is accepted. Therefore, communication frequency with the server can be reduced.

4. It is preferable that when the instruction to execute the registration request processing has been accepted, the print instruction be held at first, the registration information be newly acquired from the server in the registration request processing, and then, rejudgment in which it is rejudged whether or not the printing apparatus is the registered printing apparatus be performed. The following advantage can be obtained with the configuration. When the printing apparatus has been judged to be the registered printing apparatus in the rejudgment, the printing apparatus can be permitted to execute printing based on the held print instruction. That is, the printing apparatus can be made to execute printing based on the print instruction which has been accepted first without accepting a print instruction again. However, if it is rejudged whether or not the printing apparatus is the registered printing apparatus before the registration information is newly acquired from the server, the printing apparatus is inhibited from executing printing again. The registration request is transmitted in accordance with an operation by a user, such as input of registration information, for example. Therefore, a timing at which the rejudgment should be performed depends on the user. Accordingly, a configuration in which an instruction to make a judgment unit execute rejudgment is accepted when the instruction to execute the registration request processing has been accepted is employed. With this configuration, with an operation by the user, the judgment unit can be made to perform rejudgment after the registration information has been newly acquired from the server in the registration request processing. Therefore, a timing at which the rejudgment should be performed can be set based on the operation by the user. This makes it possible to reduce the processing load of monitoring a progressing state of the registration request processing.

5. It is preferable that the registration information be acquired from the server every time the print instruction is accepted. With this, it can be judged whether or not the printing apparatus is the registered printing apparatus based on the last registration information at the time of acceptance of each print instruction.

It is to be noted that the aspect of the invention can be specified as a print control method, a print control program, or a recording medium of a program in addition to the above print control apparatus. It is needless to say that the recording medium may be a magnetic recording medium, a magneto-optical medium, or any recording media which will be developed in future. Further, the order of operations described in aspects of the invention is not limited to the described order as long as there is no technical obstructive factor. For example, the operations may be executed simultaneously, the operation may be executed in the reverse order of the described order. Alternatively, the operation may not be executed in the continuous order.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
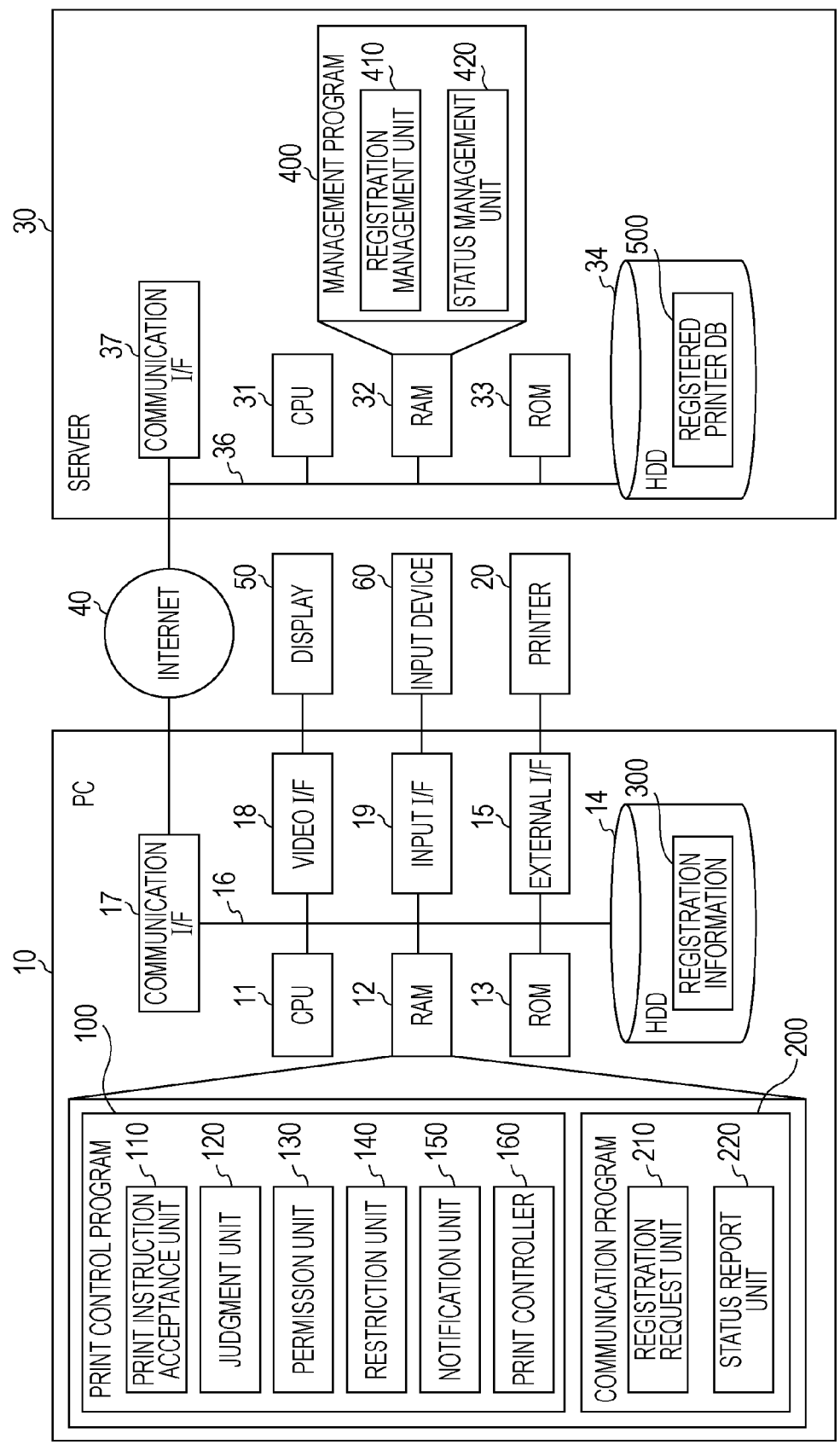
FIG. 1 is a block diagram illustrating a printer management system according to a first embodiment.

Hereinafter, an embodiment of the invention is described with reference to accompanying drawings. Same reference numerals denote corresponding components in the drawings and overlapped description is omitted.

1. Configuration of Printer Management System

A printer management system 1 has a PC (personal computer) 10 as one embodiment of a print control apparatus according to the invention, a printer 20 as a printing apparatus, and a server 30. The printer 20 and the server 30 are connected to each other in a communicatable manner through the Internet 40 as a communication line. Although not shown, a plurality of PCs 10 can be connected to the server 30 through the Internet 40 and a plurality of printers 20 can be connected to the PCs 10.

Hereinafter, the hardware configuration of the PC 10 is described. The PC 10 is configured so as to make the printer 20 execute printing in accordance with a print instruction. The PC 10 includes a CPU 11, a RAM 12, a ROM 13, a hard disk device (HDD) 14 as a recording medium, an external interface (I/F) 15, an internal interface (I/F) 16, a communication interface (I/F) 17, a video interface (I/F) 18 and an input interface (I/F) 19. A start-up program is stored in the ROM 13. Program data (not shown) for executing various types of programs and registration information 300 of the printer 20 are stored in the HDD 14. The programs include a print control program 100, a communication program 200, OS, and the like. The program data is loaded on the RAM 12 and executed by the CPU 11. The printer 20 is connected to the external I/F 15. The internal I/F 16 configures an interface which enables the CPU 11, the RAM 12, the ROM 13, the HDD 14 and the external I/F 15 to communicate with each other. The communication I/F 17 as a communication unit connects the PC 10 to the server 30 through the Internet 40. The PC 10 makes a display 50 display various types of UI images thereon through the video I/F 18. Further, the PC 10 accepts an operation by a user onto an input device 60 such as a keyboard and a mouse through the input I/F 19.

Next, a software configuration of the PC 10 for making the printer 20 execute printing based on a print instruction is described. The print control program 100 is a program for making the PC 10 execute a function of generating print control data based on a print instruction and outputting the print control data to the printer 20. Therefore, the print control program 100 has a print instruction acceptance unit 110, a judgment unit 120, a permission unit 130, a restriction unit 140, a notification unit 150, and a print controller 160. The communication program 200 has a registration request unit 210 and a status report unit 220.

Hereinafter, functions of the program modules 110 through 160 which constitute the print control program 100 are described. The print instruction acceptance unit 110 is a program module for making the PC 10 execute a function of accepting a print instruction. The print instruction is an instruction to make the printer 20 execute printing. That is to say, the PC 10 accepts a print instruction with the function of the print instruction acceptance unit 110. To be more specific, the PC 110 accepts the print instruction in accordance with an operation by a user or a request from other application programs. The print instruction includes print data to be printed and information for specifying the printer 20 which is made to execute printing, print conditions, and the like.

The judgment unit 120 is a program module for making the PC 10 execute the function of judging whether or not the printer 20 is a registered printer which has been registered when the print instruction has been accepted. The judgment is made based on the registration information 300 acquired from the server through the communication I/F 17. That is to say, the PC 10 executes the following processings with the function of the judgment unit 120. At first, the PC 10 acquires a manufacturing number (Serial Number) of the printer 20 which is instructed to execute printing by the print instruction through the external I/F 15 with the function of the judgment unit 120. The manufacturing number of the printer 20 is a unique number which is assigned to each printer 20. The manufacturing number is stored in a nonvolatile memory included in the printer 20 in a manufacturing process of the printer 20. It is to be noted that the manufacturing number of the printer 20 may be previously stored in the HDD 14 of the PC 10 so as to be acquired from the HDD 14. Next, the PC 10 acquires the registration information 300 from the HDD 14 with the function of the judgment unit 120. Then, the PC 10 compares the manufacturing number of the printer 20 with manufacturing number(s) of registered printer(s) with the function of the judgment unit 120. When the manufacturing number of the printer 20 is identical to the manufacturing number of the registered printer, it is judged that the printer 20 is a registered printer. When the manufacturing number of the printer 20 is not identical to the manufacturing number of the registered printer, it is judged that the printer 20 is not a registered printer.

The permission unit 130 is a program module for making the PC 10 execute a function of permitting the printer 20 to execute printing based on the print instruction when the printer 20 has been judged to be the registered printer. That is to say, with the function of the permission unit 130, at first, the PC 10 detects that the printer has been judged to be the registered printer. Then, the PC 10 permits print control data to be generated by the PC 10 with a function of the print controller 160. Therefore, when the printer 20 is the registered printer, the PC 10 can make the printer 20 execute printing.

The restriction unit 140 is a program module for making the PC 10 execute a function of inhibiting the printer 20 from executing printing based on the print instruction when the printer 20 has not been judged to be the registered printer. That is to say, with the function of the restriction unit 140, the PC 10 inhibits print control data from being generated by the PC 10 with the function of the print controller 160 when the printer 20 has not been judged to be the registered printer. Therefore, registration of the printer 20 can be made an essential condition in order that the printer 20 executes printing.

The notification unit 150 is a program module for making the PC 10 execute a function of holding the print instruction in the HDD 14 and making a notification which prompts a user to register the printer 20 on a server as a registered printer when the printer 20 has not been judged to be the registered printer. That is to say, when the printer 20 is not judged to be the registered printer, the PC 10 makes the display 50 display a dialog box (dialog box D2 in FIG. 3B) thereon as a notification which prompts a user to register the printer 20 with the function of the notification unit 150. In this manner, when the printer 20 is not the registered printer, the PC 10 inhibits the printer 20 from executing printing and makes a notification which prompts a user to register the printer 20. With these operations, a user can be guided so as to register the printer 20.

If the printer 20 can be registered, the printer 20 is made into a state where the printer 20 can be permitted to execute printing.

On the above dialog box, a button for accepting an instruction to start up the registration request unit 210 of the communication program 200, a button for accepting an instruction to make the judgment unit 120 perform rejudgment, and a button for instructing to cancel the printing are displayed. The buttons are displayed so as to be pressed by the input device 60. The PC 10 starts to execute a registration request processing if the registration request unit 210 of the communication program 200 is started up. The registration request processing is a processing of transmitting a registration request to the server 30 and newly acquiring registration information 300 in which a result thereof has been reflected. Note that the registration request is a request for requesting the server 30 to register the printer 20 as a registered printer. If the registration information 300 is newly acquired from the server 30 in the registration request processing, the registration information 300 in which the registration request has been reflected can be newly acquired from the server 30. In the embodiment, the registration information 300 is not acquired from the server 30 every time a print instruction is accepted but the registration information 300 is acquired from the server 30 in the registration request processing. Therefore, communication frequency with the server 30 can be suppressed.

As described above, a user can be smoothly guided so as to register the printer 20 by providing the button for accepting an instruction to start up the registration request unit 210 on the above dialog box. The above dialog box is also displayed after the instruction to start up the registration request unit 210 has been accepted. Further, the judgment unit 120 of the print control program 100 can be made to perform rejudgment with an operation by a user by providing the button for accepting an instruction to make the judgment unit 120 perform rejudgment on the dialog box. To be more specific, the judgment unit 120 of the print control program 100 can be made to perform rejudgment after the registration information 300 has been newly acquired in the registration request processing. The reason for that is as follows. That is, the user can recognize a progressing state of the registration request processing. Further, it can be considered that the user operates the button for accepting an instruction to make the judgment unit 120 perform rejudgment after the registration information 300 has been newly acquired in the registration request processing. With such configuration, the rejudgment can be performed after the registration information 300 has been newly acquired in the registration request processing. That is to say, the progressing state of the registration request processing is not needed to be monitored in a period after the instruction to start up the registration request unit 210 has been accepted. Accordingly, a processing load can be prevented from increasing.

The print controller 160 is a program module for making the PC 10 execute a function of generating print image data based on the print instruction, and generating print control data when the printer 20 has been permitted to execute printing. The print control data is generated by sequentially executing a size conversion processing, a color conversion processing, a half-tone processing, a sorting processing, and the like on the print image data. Further, the PC 10 makes the printer 20 execute printing based on the print instruction by outputting the print control data to the printer 20 with the function of the print controller 160.

Hereinafter, functions of the program modules 210 and 220 which constitute the communication program 200 are described. The registration request unit 210 is a program module for making the PC 10 execute the registration request processing. The registration request processing is a processing of transmitting a registration request for requesting the server to register the printer 20 as a registered printer to the server 30 and acquiring the registration information 300 from the server 30. The registration request includes a manufacturing number, a model name of the printer 20 to be registered, identification information of the PC 10, a user ID, and the like. The registration information 300 acquired from the server 30 is held in the HDD 14 without being updated until a subsequent registration request processing is executed. It is to be noted that in the embodiment, in a state where the print control program 100 is executed in the PC 10, the communication program 200 is not necessarily installed in the PC 10. In the embodiment, in order to acquire the registration information 300 after transmitting the registration request, it is essential that the PC 10 executes the registration request processing by the registration request unit 210. That is to say, in order to permit the printer 20 to execute printing, it is essential that the communication program 200 is installed on the PC 10.

The status report unit 220 is a program module for making the PC 10 execute the following functions. That is, the PC 10 is made to execute a function of regularly acquiring status information of the printer 20 and transmitting the status information to the server 30 and a function of making the display 50 display maintenance information returned from the server 30 in response to the status information transmission. In the embodiment, information about a usage amount of ink in the printer 20 is acquired as the status information of the printer 20. Further, a notification which prompts a user to exchange an ink tank is displayed on the display 50 as the maintenance information. Therefore, a user can recognize an appropriate timing at which an ink tank should be exchanged and can request a service center to exchange the ink tank at the appropriate exchange timing. Accordingly, it is recommended that the status report unit 220 of the communication program 200 have been started up when the printer 20 executes printing.

Next, the hardware configuration of the server 30 is described. The server 30 is configured to manage registered printers. The server 30 includes a CPU 31, a RAM 32, a ROM 33, a HDD 34, an internal I/F 36, and a communication I/F 37. A start-up program is stored in the ROM 33. Program data (not shown) for executing various types of programs and a registered printer database (DB) 500 are stored in the HDD 34. The programs include a management program 400, OS, and the like. The program data is loaded on the RAM 32 and executed by the CPU 31. The internal I/F 36 configures an interface which enables the CPU 31, the RAM 32, the ROM 33 and the HDD 34 to communicate with each other. The communication I/F 37 connects the server 30 to the PC 10 through the Internet 40.

A software configuration of the server 30 is described. The management program 400 is a program for making the server 30 execute a function of managing the registered printers. The management program 400 has a registration management unit 410 and a status management unit 420.

Hereinafter, functions of the program modules 410 and 420 which constitute the management program 400 are described. The server 30 registers the printer 20 as a registered printer in accordance with the above registration request with the function of the registration management unit 410. To be more specific, the server 30 registers the printer 20 by adding the manufacturing number of the printer 20, identification information of the PC 10, user ID, and model name onto the registered printer DB 500 so as to correspond to each other.

Further, the server 30 transmits the registration information 300 in which the registration of the printer 20 has been reflected to the PC 10 which has transmitted the registration request with the function of the registration management unit 410. In the registration information 300, manufacturing number(s) of the printer(s) 20 which has/have been registered so as to correspond to the identification information of the PC 10 which has transmitted the registration request is/are listed. Accordingly, the manufacturing numbers of the printers 20 which have been registered in accordance with registration requests transmitted from other PCs 10 are not included in the registration information 300.

The server 30 analyzes the status information of the printer 20, which has been received from the PC 10, and returns maintenance information of the printer 20 to the PC 10 with the function of the status management unit 420. In the embodiment, the server 30 analyzes information about a usage amount of ink in the printer 20 as the status information and transmits information for displaying a notification which prompts a user to exchange an ink tank of the printer 20 as the maintenance information. It is to be noted that it is essential that the printer 20 is the registered printer in order that the status management unit 420 provides the maintenance information.

2. Print Control Processing

Figure 2:
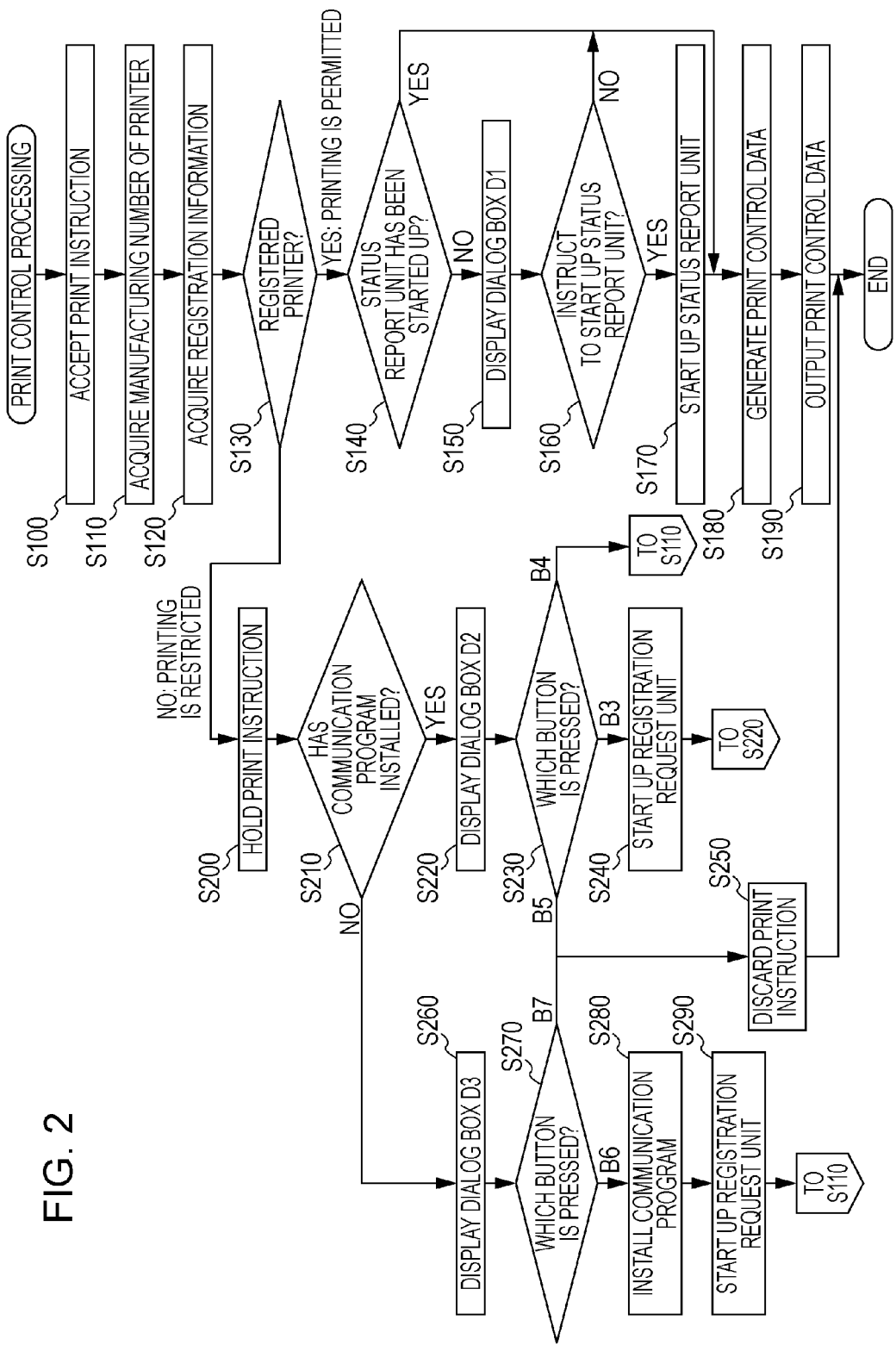
FIG. 2 is a flowchart of a print control processing.

FIG. 2 is the flowchart of a print control processing. At first, the PC 10 accepts a print instruction to make the printer 20 execute printing with the function of the print instruction acceptance unit 110 (S100). Next, the PC 10 acquires the manufacturing number of the printer 20 through the external I/F 15 with the function of the judgment unit 120 (S110). Information which specifies the printer 20 which is made to execute printing is included in the print instruction. Therefore, the PC 10 specifies the printer 20 of which manufacturing number should be acquired based on the information. Next, the PC 10 acquires the registration information 300 from the HDD 14 with the function of the judgment unit 120 (S120).

The PC 10 judges whether or not the manufacturing number of the printer 20 is identical to any one of manufacturing number(s) of registered printer(s) listed on the registration information 300 with the function of the judgment unit 120 (S130). Manufacturing number(s) of a single registered printer or a plurality of registered printers is/are listed on the registration information 300. The single printer or the plurality of registered printers has/have been registered by the PC 10 as the printer(s) 20 capable of executing printing. When any one of manufacturing number(s) included in the registration information 300 is identical to the manufacturing number of the printer 20 which is made to execute printing, the printer 20 which is made to execute printing is judged to be a registered printer. On the other hand, when any of the manufacturing number(s) of the registered printer(s) are not identical to the manufacturing number of the printer 20 which is made to execute printing, the printer 20 which is made to execute printing is not judged to be a registered printer.

When the printer 20 which is made to execute printing has been judged to be a registered printer, the PC 10 permits the printer 20 to execute printing based on the print instruction with the function of the permission unit 130. Then, the PC 10 judges whether or not the status report unit 220 of the communication program 200 has been started up with the function of the permission unit 130 (S140). It is to be noted that since the communication program 200 and the print control program 100 are different programs from each other, the status report unit 220 of the communication program 200 is not started up while the print control program 100 is being executed in some case. When the status report unit 220 of the communication program 200 has not been started up, the PC 10 makes the display 50 display a dialog box D1 thereon with the function of the permission unit 130 (S150).

Figure 3A:
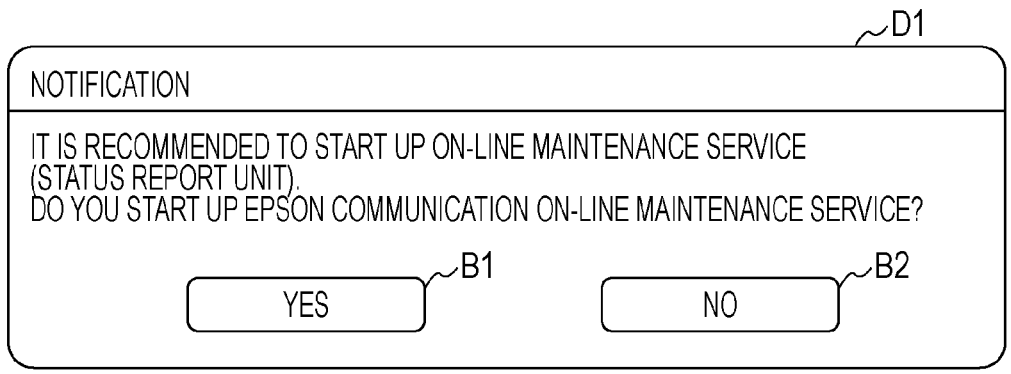
FIGS. 3A through 3C are views illustrating a dialog box.

FIG. 3A is a diagram illustrating one example of the dialog box D1. On the dialog box D1, a message which recommends to start up the status report unit 220 of the communication program 200 is displayed. Further, in addition to the message, a button B1 and a button B2 are displayed on the dialog box D1 so as to be pressed. The button B1 is a button for starting up the status report unit 220, and then, executing printing. The button B2 is a button for making the printer 20 execute printing without starting up the status report unit 220. The PC 10 accepts pressing of any one of the buttons B1 and B2 during a period where the dialog box D1 is displayed with the function of the permission unit 130 (S160). When the button B1 is pressed, the PC 10 starts up the status report unit 220 (S170), and then, generates print control data with the function of the print controller 160 (S180). On the other hand, when the button B2 is pressed, the PC 10 generates the print control data with the function of the print controller 160 without starting up the status report unit 220 (S180). In step S180, the PC 10 generates print image data based on the print instruction and further generates print control data with the function of the print controller 160. The print control data is generated by sequentially executing a size conversion processing, a color conversion processing, a half-tone processing, a sorting processing, and the like on the print image data. Further, the PC 10 makes the printer 20 execute printing based on the print instruction by outputting the print control data to the printer 20 with the function of the print controller 160 (S190).

As described above, when the printer 20 which is made to execute printing has been judged to be a registered printer, the printer 20 is permitted to execute printing based on the print instruction. Further, when the status report unit 220 of the communication program 200 has not been started up, it is recommended that the status report unit 220 be started up. When printing is executed, if the status report unit 220 has been started up, appropriate maintenance information can be proposed with the function of the status report unit 220.

On the other hand, when the printer 20 which is made to execute printing has not been judged to be a registered printer, the PC 10 inhibits print control data from being generated based on the print instruction with the function of the restriction unit 140. That is to say, the registration of the printer 20 as a registered printer is an essential condition in order that the printer 20 executes printing. Hereinafter, a processing when the printing on the printer 20 is inhibited from being executed is described. At first, the PC 10 holds the print instruction in the HDD 14 with the function of the notification unit 150 (S200). Next, the PC 10 judges whether or not the communication program 200 has been installed on the PC 10 with the function of the notification unit 150 (S210). When it has been judged that the communication program 200 has been installed on the PC 10, the PC 10 makes the display 50 display the dialog box D2 thereon with the function of the notification unit 150 (S220).

Figure 3B:
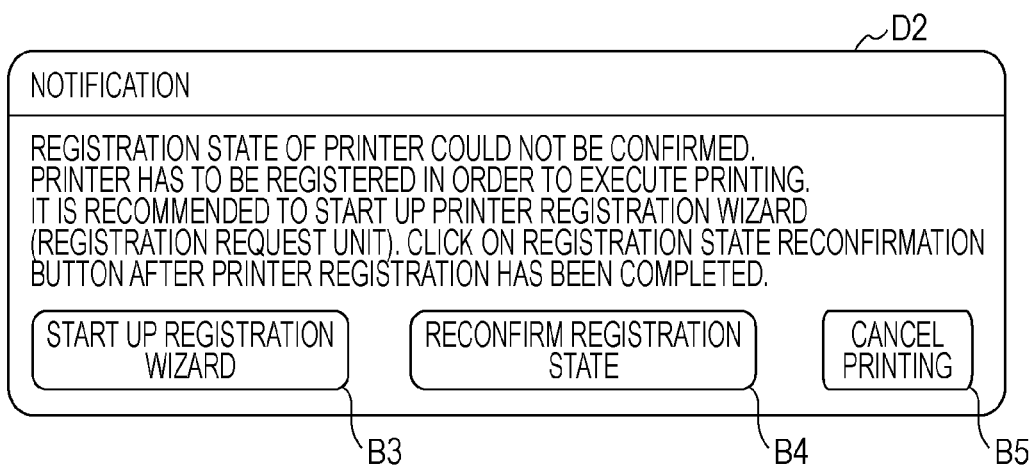

FIG. 3B is a diagram illustrating one example of the dialog box D2. On the dialog box D2, a message which prompts a user to start up the registration request unit 210 (printer registration wizard) is displayed. In addition to the message, a button B3, a button B4, and a button B5 are displayed on the dialog box D2 so as to be pressed. The button B3 is a button for starting up the registration request unit 210 of the communication program 200. The button B4 is a button for making the PC 10 rejudge whether or not the printer 20 has been registered with the function of the judgment unit 120. The button B5 is a button for instructing to cancel printing. The PC 10 accepts pressing of any one of the buttons B3 through B5 during a period where the dialog box D2 is displayed with the function of the notification unit 150 (S230).

When the button B3 for starting up the registration request unit 210 of the communication program 200 is pressed, the PC 10 starts up the registration request unit 210 to start the registration request processing with the function of the notification unit 150. If the PC 10 starts up the registration request unit 210 with the function of the print control program 100, the process returns to step S220. Then, the PC 10 accepts a pressing of any one of the buttons B3 through B5 on the dialog box D2 again (S230). That is to say, the PC 10 is made into a stand-by state while the dialog box D2 is displayed after the registration request processing has been started.

Figure 4:
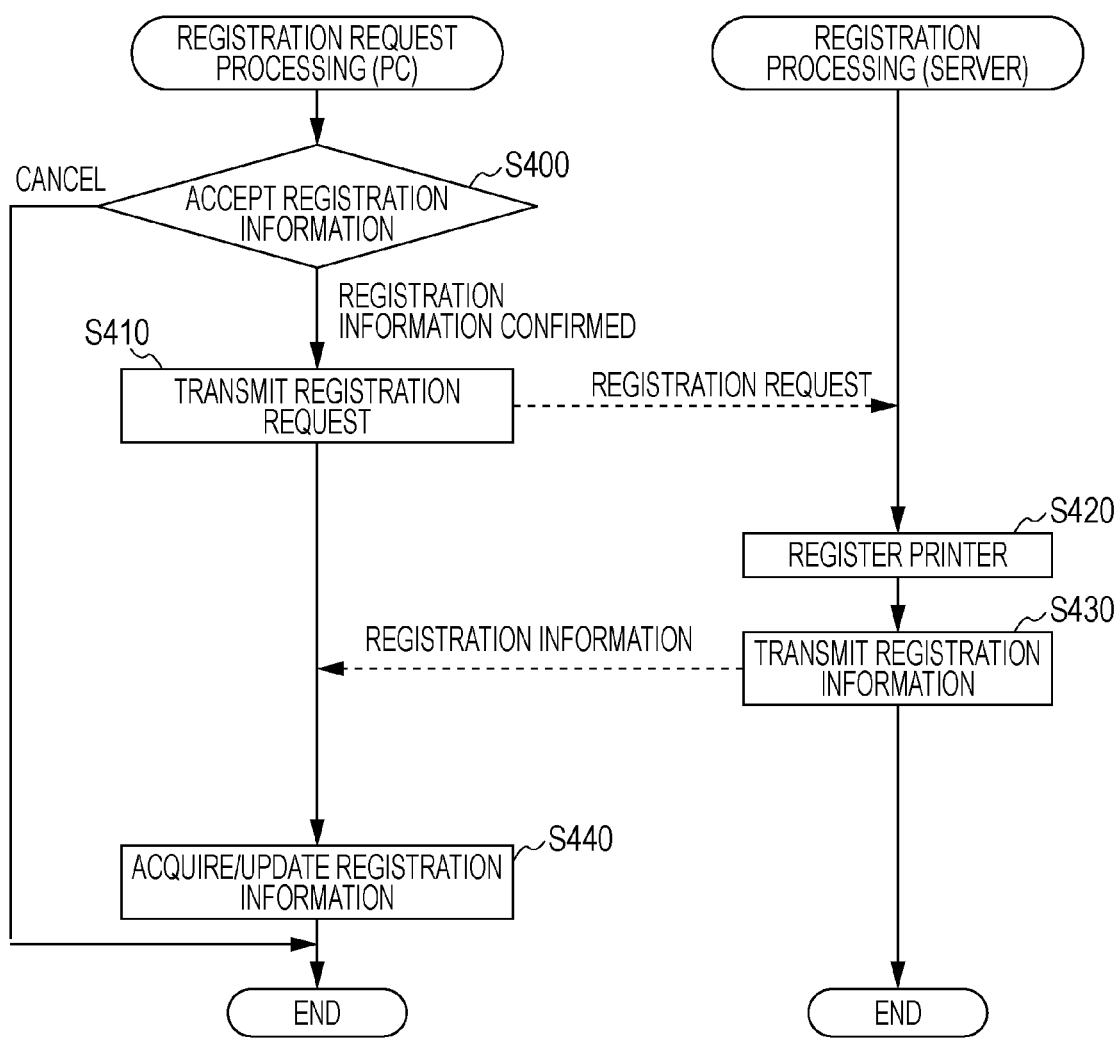
FIG. 4 is a flowchart of a registration request processing.

FIG. 4 is a flowchart of the registration request processing. In the registration request processing, the PC 10 accepts inputs of information relating to a user, information relating to a maintenance contract, and the like. If the PC 10 accepts an operation for confirming these pieces of information (S400), the PC 10 transmits the registration request to the server 30 in accordance with the operation (S410). Further, when a user operates to cancel the registration request processing (S400), the registration request processing is finished. The registration request includes at least a manufacturing number of the printer 20 to be registered, identification information of the PC 10, a user ID, and the like. If the server 30 receives the registration request, the following operations are performed. That is, with the function of the registration management unit 410, the server 30 stores the manufacturing number of the printer 20, the identification information of the PC 10, and the user ID in the registered printer DB 500 so as to correspond to each other to register the printer 20 as a registered printer (S420). Further, the server 30 transmits the registration information 300 to the PC 10 with the function of the registration management unit 410 (S430). To be more specific, the server 30 searches manufacturing number(s) of registered printer(s) corresponding to the identification information of the PC 10 to which the registration information 300 is transmitted on the registered printer DB 500. Then, the searched manufacturing number(s) of the registered printer(s) is/are listed so as to be transmitted to the PC 10 as the registration information 300. At this time, when a plurality of registered printers have been registered in accordance with the registration requests from a single PC 10, the manufacturing numbers of the plurality of registered printers are listed. In the embodiment, the manufacturing number of a registered printer corresponds to identification information of the PC 10. Therefore, even when the printers 20 have been registered as registered printers, the manufacturing numbers of the printers 20, which have been registered by the PCs 10 other than the PC 10 which has executed the registration request processing of the printer 20 are not listed.

The PC 10 acquires the registration information 300 received from the server 30 and updates the registration information 300 in the HDD 14 with the function of the registration request unit 210 (S440). In this manner, if the registration information 300 has been newly acquired, the registration request processing is completed.

When the button B4 for making the PC 10 rejudge whether or not the printer 20 has been registered is pressed in step S230 (FIG. 2), the process returns to step S110. That is to say, it is rejudged whether or not the printer 20 which is made to execute printing is a registered printer with the function of the judgment unit 120. If the registration request processing has been completed, the printer 20 which is made to execute printing is judged to be a registered printer. Therefore, printing on the printer, which has been once inhibited from being executed, is permitted. Since the PC 10 holds the print instruction in the HDD 14, the print instruction is acquired from the HDD 14 so that printing can be executed. Since an operation by a user is essential in order to complete the registration request processing, the PC 10 cannot predict a timing at which the registration request processing is completed, that is, a timing at which rejudgment should be executed. Further, the printing is cancelled in accordance with an operation by the user although the registration request processing is not completed in some case. Therefore, the PC 10 cannot also predict whether or not the rejudgment should be executed. However, it is considered that a user presses the button B4 at a time point at which the registration request processing has been completed. Therefore, the rejudgment can be executed after the registration request processing has been completed without monitoring a progressing state of the registration request processing with the communication between the processings, for example in a period after the button B3 for starting up the registration request unit 210 has been pressed.

When the button B5 for instructing to cancel the printing is pressed in step S230, the print instruction held in the HDD 14 is discarded (S250), and the print control processing is finished. Therefore, when the registration request processing is cancelled, the print control processing can be also cancelled.

Next, a processing when the communication program 200 has not been installed on the PC 10 is described. At first, the PC 10 makes the display 50 display the dialog box D3 thereon with the function of the notification unit 150 (S260).

Figure 3C:
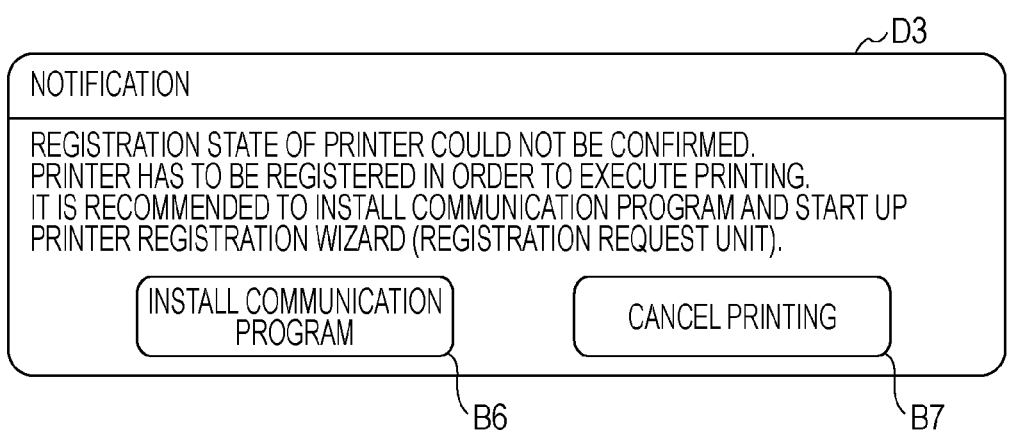

FIG. 3C is a diagram illustrating one example of the dialog box D3. A message which prompts a user to install the communication program 200 is displayed on the dialog box D3. Further, in addition to the message, a button BE and a button B7 are displayed on the dialog box D3 so as to be pressed. The button BE is a button for installing the communication program 200. The button B7 is a button for instructing to cancel printing. The PC 10 accepts pressing of any one of the buttons BE and B7 during a period where the dialog box D3 is displayed with the function of the notification unit 150 (S270).

When a pressing of the button BE for installing the communication program 200 is accepted in step S280, the communication program 200 is installed (S280). After that, the registration request unit 210 is started up (S290), and then, the process returns to step S110. Since the process returns to step S110 after the registration request unit 210 has been started up, it is rejudged whether or not the printer 20 which is made to execute printing is a registered printer. At this time, if the registration request processing has been completed, the printer 20 which is made to execute printing is judged to be a registered printer. Therefore, printing on the printer 20, which has been once inhibited from being executed, is permitted. On the other hand, if the registration request processing has not been completed, printing on the printer 20 is inhibited from being executed again. In this case, the PC 10 is made into a stand-by state while the dialog box D2 is displayed (S230). That is to say, even when the communication program 200 is installed, after the registration request processing has been started, the dialog box D2 is displayed. Therefore, the PC 10 can be in the stand-by state until the registration request processing is completed without inquiring the progressing state of the registration request processing all the time with the function of the print control program 100.

When the button B7 for instructing to cancel printing is pressed in step S270, the print instruction held in the HDD 14 is discarded (S250), and the print control processing is finished.

3. Another Embodiment

In the first embodiment, the registration information 300 is acquired from the server 30 in the registration request processing. That is to say, the PC 10 performs the processing of transmitting a registration request of the printer 20 and the processing of acquiring the registration information 300 from the server 30 in combination. However, in a case where the printer 20 is registered by a method in which the PC 10 is not involved in the registration of the printer 20, a following problem arises. Note that the case where the printer 20 is registered by a method in which the PC 10 is not involved in the registration of the printer 20 includes a case where the server 30 registers the printer 20 based on a phone call, a facsimile, or the like from a user, for example. In such a case, if the PC 10 cannot perform the processing of acquiring the registration information 300 from the server 30 separately from the transmission of the registration request, the PC 10 cannot acquire the registration information 300 in which the phone call, the facsimile, or the like from the user has been reflected from the server 30. Therefore, a configuration in which the processing of acquiring the registration information 300 from the server 30 can be executed separately from the transmission of the registration request may be employed. For example, the registration information 300 is acquired from the server 30 every time a print instruction is accepted (step S100 in FIG. 2). With this, the PC 10 can judge whether or not the printer 20 is a registered printer based on the last registration information 300 at the time of acceptance of each print instruction. In this case, printing on the printer 20 which has been registered by a method in which the PC 10 is not involved can be permitted to be executed.

Further, the following configuration may be employed. That is, the PC 10 inquires of the server 30 whether or not the printer 20 specified by the print instruction is registered every time a print instruction is accepted. Further, the server 30 returns binary information indicating whether or not the printer 20 is a registered printer as the registration information 300. In this case, a program module corresponding to the judgment unit 120 is executed by the server 30. Note that the program module corresponding to the judgment unit 120 judges whether or not the printer 20 is a registered printer based on a manufacturing number of the printer 20. The program module corresponding to the judgment unit 120 can judge whether or not the printer 20 is a registered printer based on a manufacturing number thereof with reference to the registered printer DB 500 on the server 30.

What is claimed is:

1. A print control apparatus comprising:
a communication unit which communicates with a server;
a print instruction acceptance unit which accepts a print instruction to make a printing apparatus execute printing;
a judgment unit which judges whether or not the printing apparatus is a registered printing apparatus which has been registered on the server based on registration information acquired from the server through the communication unit when the print instruction has been accepted;
a permission unit which permits the printing apparatus to execute printing based on the print instruction when the printing apparatus has been judged to be the registered printing apparatus;
a restriction unit which inhibits the printing apparatus from executing printing based on the print instruction when the printing apparatus has not been judged to be the registered printing apparatus; and
a notification unit which makes a notification for prompting a user to register the printing apparatus on the server as the registered printing apparatus in response to accepting the print instruction to execute printing when the printing apparatus has not been judged to be the registered printing apparatus.

2. The print control apparatus according to claim 1, wherein the notification unit accepts an instruction to execute a registration request processing of requesting the server to register the printing apparatus as the registered printing apparatus.

3. The print control apparatus according to claim 2, wherein in the registration request processing, a registration request for requesting the server to register the printing apparatus as the registered printing apparatus is transmitted to the server, and then, the registration information is newly acquired from the server.

4. The print control apparatus according to claim 3, wherein in the registration request processing, the registration request is transmitted to the server in accordance with an operation by a user, and
when an instruction to execute the registration request processing has been accepted, the notification unit holds the print instruction and accepts an instruction to make the judgment unit execute rejudgment in which it is rejudged whether or not the printing apparatus is the registered printing apparatus based on the registration information, and
when the printing apparatus has been judged to be the registered printing apparatus in the rejudgment, the permission unit permits the printing apparatus to execute printing based on the held print instruction.

5. The print control apparatus according to claim 1, wherein the registration information is acquired from the server every time the print instruction is accepted.

6. The print control apparatus according to claim 1, wherein the restriction unit further holds the print instruction in memory until the printing apparatus is registered or until a user cancels the printing instruction.

7. A non-transitory storage medium which stores a print control program which makes a computer execute:
a communication function of communicating with a server;
a print instruction acceptance function of accepting a print instruction to make a printing apparatus execute printing;
a judgment function of judging whether or not the printing apparatus is a registered printing apparatus which has been registered on the server based on registration information acquired from the server through the communication function when the print instruction has been accepted;
a permission function of permitting the printing apparatus to execute printing based on the print instruction when the printing apparatus has been judged to be the registered printing apparatus;
an inhibiting function of inhibiting the printing apparatus from executing printing based on the print instruction when the printing apparatus has not been judged to be the registered printing apparatus; and
a notification function of making a notification for prompting a user to register the printing apparatus on the server as the registered printing apparatus in response to accepting the print instruction to execute printing when the printing apparatus has not been judged to be the registered printing apparatus.

8. The non-transitory storage medium of claim 7, wherein the inhibiting function further holds the print instruction in memory until the printing apparatus is registered or until a user cancels the printing instruction.

* * * * *